(12) United States Patent
Bolling

(10) Patent No.: US 7,021,586 B2
(45) Date of Patent: Apr. 4, 2006

(54) FORCE FEEDBACK REFUELING SYSTEM FOR UNMANNED AIRCRAFT

(75) Inventor: John G. Bolling, Maryland Heights, MO (US)

(73) Assignee: The Boeing Company, Chicago, IL (US)

(*) Notice: Subject to any disclaimer, the term of this patent is extended or adjusted under 35 U.S.C. 154(b) by 377 days.

(21) Appl. No.: 10/782,253

(22) Filed: Feb. 19, 2004

(65) Prior Publication Data

US 2005/0224657 A1 Oct. 13, 2005

(51) Int. Cl.
*B64C 1/00* (2006.01)

(52) U.S. Cl. .................................. 244/135 A
(58) Field of Classification Search ............. 244/135 R, 244/135 A; B64C 1/00, 5/00, 3/00, 39/00
See application file for complete search history.

(56) References Cited

U.S. PATENT DOCUMENTS

| | | | | |
|---|---|---|---|---|
| 3,917,196 A | * | 11/1975 | Pond et al. .................... 342/23 |
| 4,633,376 A | * | 12/1986 | Newman .................... 362/470 |
| 4,763,861 A | * | 8/1988 | Newman ................ 244/135 A |
| 5,131,438 A | * | 7/1992 | Loucks .......................... 141/1 |
| 5,326,052 A | * | 7/1994 | Krispin et al. .......... 244/135 A |
| 5,904,729 A | * | 5/1999 | Ruzicka ..................... 701/300 |
| 5,906,336 A | * | 5/1999 | Eckstein ................. 244/135 A |
| 6,604,711 B1 | * | 8/2003 | Stevens et al. ......... 244/135 A |
| 6,644,594 B1 | * | 11/2003 | Hunn et al. ............. 244/135 R |
| 6,669,145 B1 | * | 12/2003 | Green .................... 244/135 A |

\* cited by examiner

*Primary Examiner*—Teri P. Luu
*Assistant Examiner*—Stephen A. Holzen
(74) *Attorney, Agent, or Firm*—Thompson Coburn LLP

(57) ABSTRACT

An in-flight refueling system for an unmanned aircraft is responsive to sensed forces acting on a refueling receptacle of the aircraft by a separate refueling probe, to control movements of the aircraft as it is being refueled to reduce the magnitude of the sensed forces and thereby maintain the coupling of the aircraft with the refueling probe.

20 Claims, 3 Drawing Sheets

FORCE FEEDBACK REFUELING SYSTEM FOR UNMANNED AIRCRAFT

BACKGROUND OF THE INVENTION (1) Field of the Invention

The present invention pertains to an aerial refueling system for unmanned aircraft. More specifically, the present invention pertains to an apparatus and method for refueling an unmanned aircraft in-flight. The apparatus is responsive to sensed forces acting on a refueling receptacle of the aircraft by a separate refueling probe, to control movements of the aircraft as it is being refueled to reduce the magnitude of the sensed forces and thereby maintain the coupling of the aircraft with the refueling probe.

(2) Description of the Related Art

Aerial refueling systems have been used in aircraft for many years. The systems find extensive use in military aircraft to extend the travel range and flight time of the aircraft. A typical refueling system employs a receptacle on the exterior of the receiving aircraft that is designed to receive and couple with a refueling probe of a fuel supplying aircraft.

In the operation of a typical aircraft refueling system, the refueling probe of the fuel supplying aircraft is extended to a position that is displaced a sufficient distance from the aircraft to enable a receiving aircraft to safely approach and couple with the extended probe. The receiving aircraft has a refueling receptacle on its exterior. The pilot of the receiving aircraft maneuvers the aircraft into a position where the distal end of the supplying aircraft refueling probe will be received in the refueling receptacle of the receiving aircraft.

In known in-flight refueling systems, the distal end of the refueling probe is typically coupled to the receiving aircraft when the probe distal end is received in the receiving aircraft refueling receptacle. The coupling between the refueling probe and the receiving aircraft refueling receptacle enables fuel to be safely transferred from the fuel supplying aircraft to the receiving aircraft. However, the coupling between the supplying aircraft refueling probe and the receiving aircraft refueling receptacle is not sufficiently strong to keep the receiving aircraft coupled to the supplying aircraft. It is necessary that the pilot of the receiving aircraft maneuver the aircraft and hold the aircraft in a position where the coupling between the supplier aircraft refueling probe and the receiving aircraft refueling receptacle is maintained.

With the growing use of unmanned aircraft in military combat and reconnaissance operations as well as in other operations, it has become desirable to perform in-flight refueling of the unmanned aircraft. With the ability to refuel the unmanned aircraft in-flight, the aircraft can increase its travel range, increase its flight time, and ultimately improve its performance in conducting the mission for which the unmanned aircraft has been chosen. However, unlike refueling operations conducted by manned aircraft where the pilot of the receiving aircraft is capable of maneuvering the aircraft to maintain the coupling with the refueling probe of the fuel supplying aircraft, in-flight refueling of unmanned aircraft presents unique problems. It can be appreciated that the tracking, the capturing or coupling, and maintaining the coupling of a refueling probe with the refueling receptacle of an unmanned aircraft having little or no visual information on the location of the refueling probe relative to the unmanned aircraft can be extremely challenging. To further complicate the desirability of refueling unmanned aircraft, the current existing fleet of supplier tanker aircraft imposes additional design constraints on the in-flight refueling of unmanned aircraft. In particular, any in-flight refueling system for unmanned aircraft requiring modifications or upgrades to the computer control systems of the supplier tanker aircraft may be critiqued as being too costly and/or impractical to implement.

SUMMARY OF THE INVENTION

The present invention provides an apparatus and method for refueling an unmanned aircraft in-flight by maintaining contact between the fuel receiving unmanned aircraft and a separate refueling probe of a fuel supplying aircraft. The apparatus and method control movements of the receiving aircraft, whereby forces acting on a refueling receptacle of the receiving aircraft by the refueling probe of the supplying aircraft are reduced to a magnitude that is sufficiently small to avoid inadvertent decoupling of the refueling probe from the receiving aircraft refueling receptacle.

The force feedback in-flight refueling apparatus of the invention is basically comprised of a modified refueling receptacle and a computerized control coupler that communicates with the receptacle and the existing control architecture of the receiving unmanned aircraft.

The refueling receptacle of the unmanned aircraft can be any known type of aircraft refueling receptacle that has been modified for the refueling apparatus of the invention: A plurality of load cells are mounted to the refueling receptacle's structural housing. The load cells are strategically positioned on the receptacle housing to measure the magnitude and direction of forces acting on the receptacle housing by the separate refueling probe when in-flight refueling is taking place. In a preferred embodiment, the plurality of load cells are mounted on the refueling receptacle to sense the magnitudes and directions of external forces acting on the refueling receptacle along three mutually perpendicular axes.

The control coupler uses the position and orientation of the refueling receptacle on the aircraft relative to the aircraft center of gravity to transform the component forces acting along the three mutually perpendicular axes at the refueling receptacle into equivalent external forces and moments acting on the unmanned aircraft's center of gravity. The control coupler then sends commands to the aircraft control architecture to cause the aircraft to move in a manner where the transformed external forces and moments acting at the aircraft center of gravity are reduced or eliminated, and thereby reduces or eliminates the external forces exerted by the separate refueling probe on the aircraft refueling receptacle.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

Figure 1:
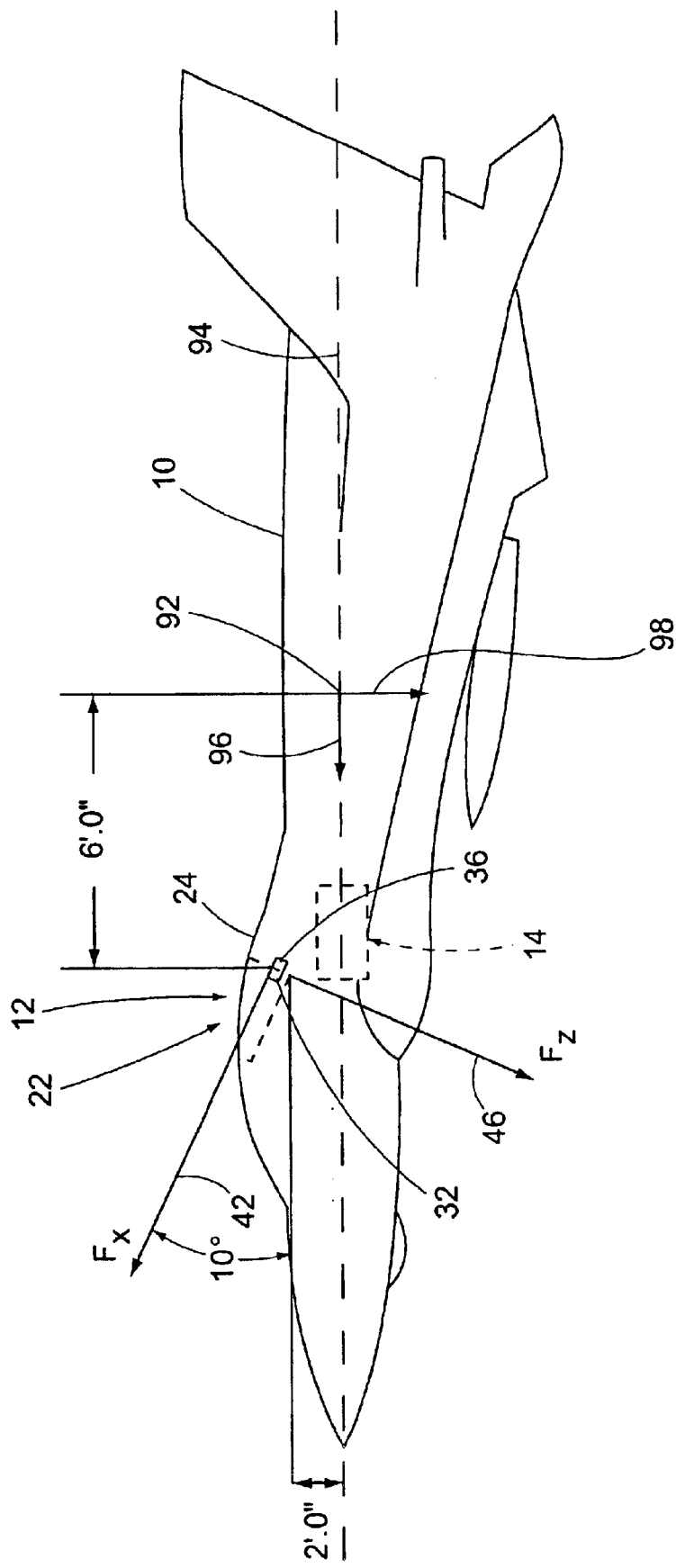
FIG. 1 is a schematic representation of an unmanned aircraft employing the force feedback in-flight refueling system of the invention.

FIG. 1 shows a schematic representation of an aircraft (10) with which the force feedback in-flight refueling system of the invention is employed. In the preferred embodiment or best mode of the invention, it is employed in an unmanned aircraft (10) for refueling of the aircraft in-flight. However, it should be understood that the system of the invention may be employed in other types of aircraft, including manned aircraft. Basically, the force feedback in-flight refueling system of the invention is comprised of a modified refueling receptacle (12) of the aircraft, and a computerized control coupler (14) that communicates with the modified refueling receptacle (12) and the existing control architecture (16) of the aircraft.

Figure 2:
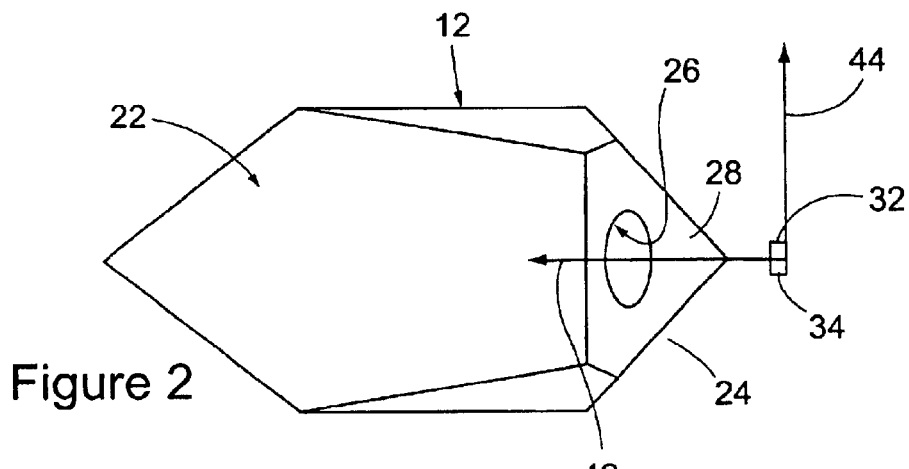
FIG. 2 is a schematic representation of a plan view of the modified refueling receptacle of the aircraft of FIG. 1.
Figure 3:
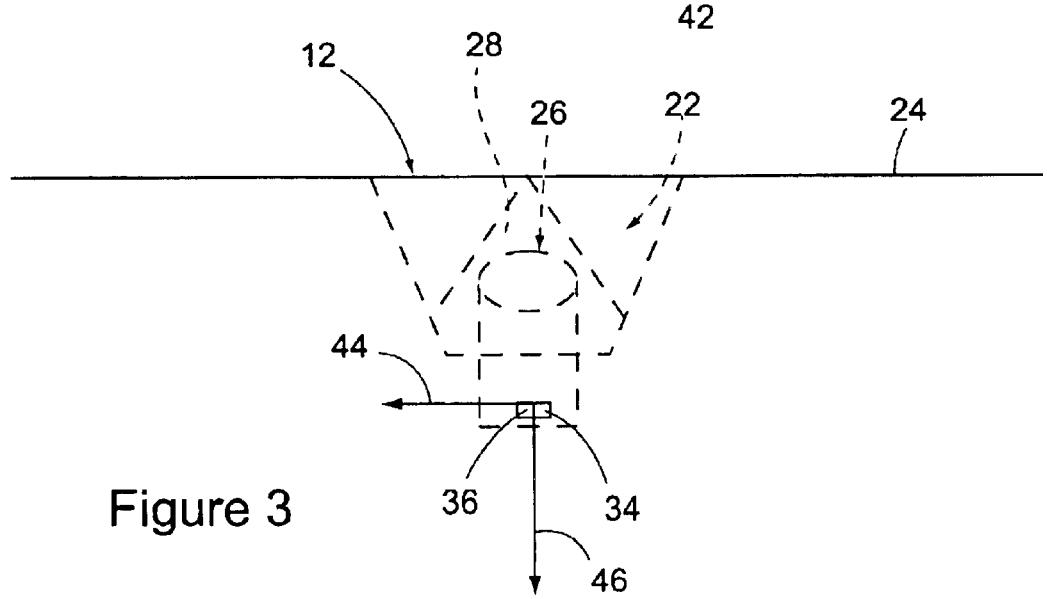
FIG. 3 is a schematic representation of a front view of the refueling receptacle of FIG. 2.
Figure 4:
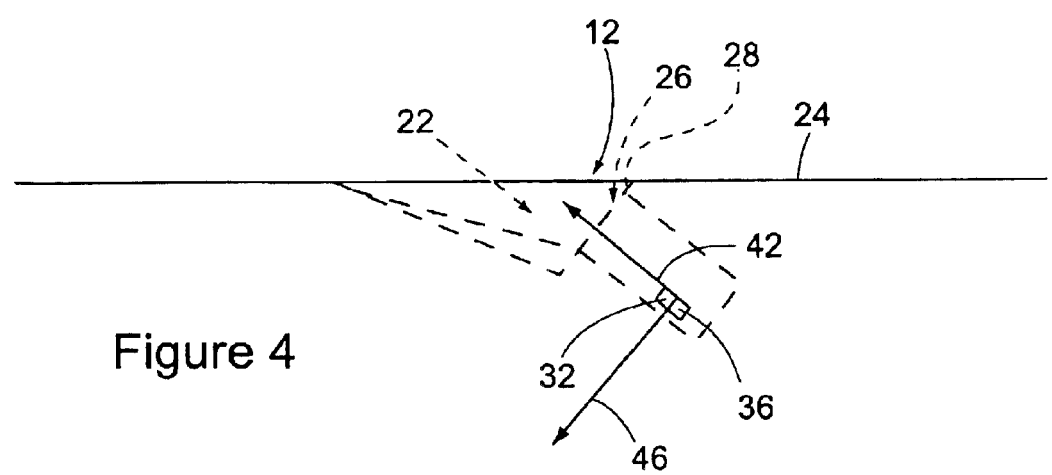
FIG. 4 is a schematic representation of a side view of the refueling receptacle of FIG. 2; and, FIG. 5 is a schematic representation of the aircraft control architecture and the control coupler of the force feedback in-flight refueling system of the invention.

FIGS. 2–4 show schematic representations of the refueling receptacle (12) of the invention. The refueling receptacle (12) is positioned at the back of a slipway (22) that is recessed into the exterior surface (24) of the aircraft's fuselage. The refueling receptacle (12) has a receiver opening (26) positioned in a back wall (28) of the slipway. The receiver opening (26) is dimensioned and configured to receive the distal end of a separate refueling probe (not shown) of a supplier tanker aircraft for refueling of the aircraft (10) in-flight. Although the slipway (22) and refueling receptacle (12) are shown recessed into the exterior surface (24) of the aircraft, the refueling receptacle (12) could be positioned at other locations of the aircraft (10) and the environment shown in FIGS. 2–4 should not be interpreted as limiting.

A plurality of sensors are positioned in the refueling receptacle (12). In the preferred embodiment of the invention, three pairs of redundant sensors are employed. To simplify the description of the invention, schematic representations of three sensors (32), (34), (36) are shown in FIGS. 2–4. Although only three sensors (32), (34), (36) are shown in the drawing figures, it should be understood that additional sensors may be employed in the refueling receptacle (12) of the invention, and that in the preferred embodiment each of the three sensors (32), (34), (36) is actually a pair of sensors with each additional sensor of the pair providing redundancy in the apparatus of the invention.

A first sensor (32) of the three sensors is a load cell that is positioned in the receptacle (12) to sense the magnitude of forces exerted by a separate refueling probe (not shown) on the refueling receptacle (12) along an X-axis (42) of the receptacle. A second sensor (34) of the three sensors is a load cell that is positioned on the refueling receptacle (12) to sense the magnitude of forces exerted by the refueling probe (not shown) on the receptacle (12) along a Y-axis (44) of the receptacle. The receptacle Y-axis (44) is oriented perpendicular to the receptacle X-axis (42) and extends to one side of the receptacle x-axis (42) as shown in FIG. 2. A third sensor (36) of the three sensors is a load cell that is positioned on the refueling receptacle (12) to sense the magnitude of forces exerted by the refueling probe (not shown) on the refueling receptacle (12) along a Z-axis (46) of the receptacle. The receptacle Z-axis (46) is mutually perpendicular with both the receptacle X-axis (42) and the receptacle Y-axis (44). As shown in FIGS. 2–4, the directions represented by the arrows of the receptacle X-axis (42), the receptacle Y-axis (44), and the receptacle Z-axis (46) designate the directions of positive forces acting on the refueling receptacle (12) along the respective axes, with it being understood that negative forces exerted on the refueling receptacle (12) are in the opposite directions from those shown in the drawing figures.

Each of the three load cell sensors (32), (34), (36) are strategically placed in the refueling receptacle (12) in such a way as to measure the magnitude and direction of the coupling force acting on the refueling receptacle (12) by a refueling probe (not shown) coupled with the receptacle. The three-dimensional force vector acting on the refueling receptacle (12) has components Fx, Fy, Fz in the three-axis system defined at the refueling receptacle (12). The directions of the positive values of these force components Fx, Fy, Fz is shown in FIGS. 2–4. The tensile force Fx is the force exerted by the refueling probe on the refueling receptacle (12) that tends to pull the receptacle out from its housing in the aircraft fuselage (24). The other two lateral forces, the side force Fy, and the down force Fz, are normal to the tensile force Fx and exert stress on the structural housing of the refueling receptacle (12) in their respective directions. Again, the arrows shown in FIGS. 2–4 designate the positive force sign conventions for the force components Fx, Fy, Fz.

The computerized control coupler (14) communicates with the three sensors (32), (34), (36) of the refueling receptacle (12) and with the control system architecture (16) of the aircraft (10). The control coupler (14) uses the mounted position and orientation of the refueling receptacle (12) relative to the aircraft center of gravity (92) to transform the receptacle force components Fx, Fy, Fz into equivalent external forces and moments acting on the aircraft center of gravity (92).

Figure 5:
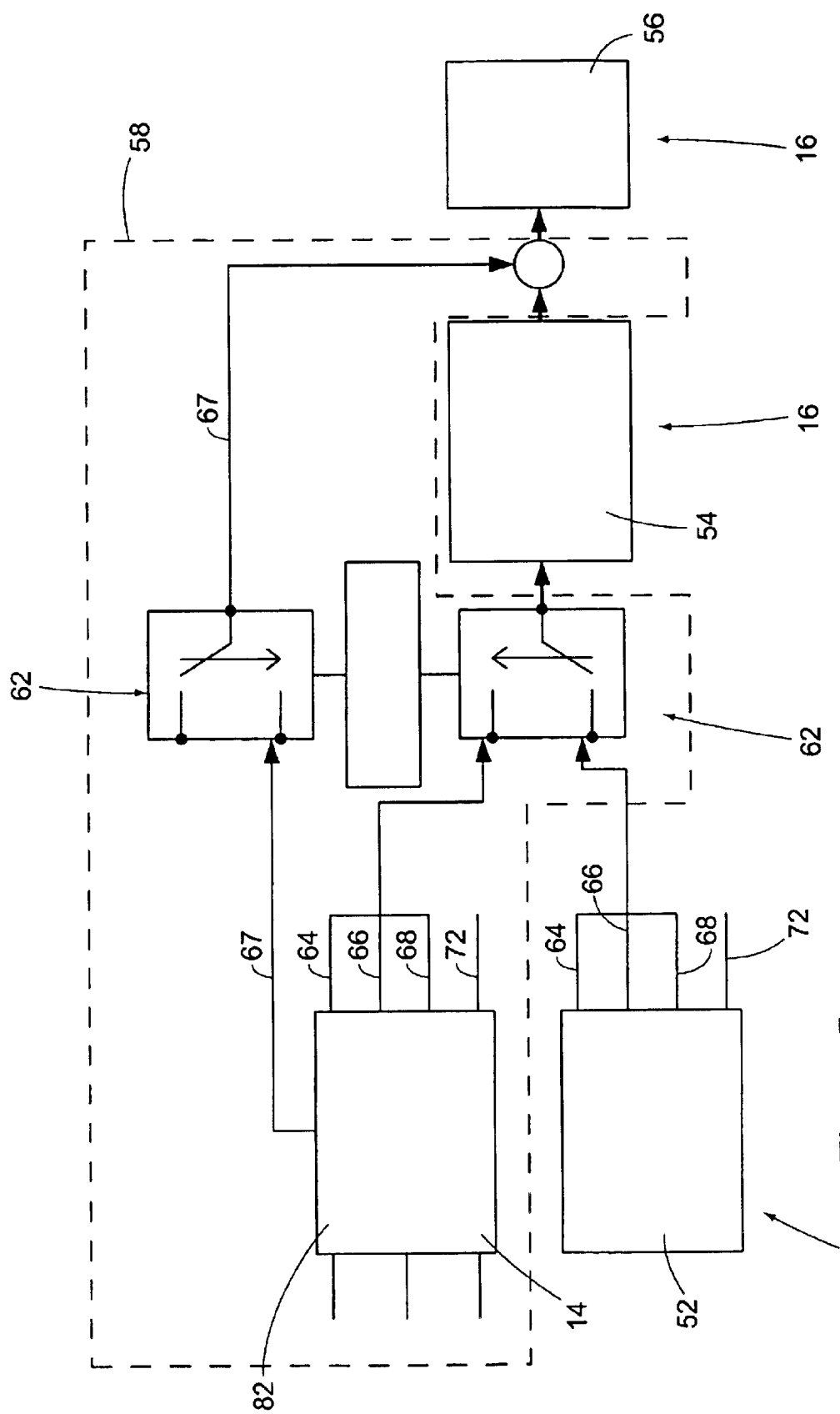

FIG. 5 is a schematic representation of a modern aircraft control system architecture. Generally, known aircraft control system architectures are comprised of an outer-loop guidance component (52), an inner-loop control component (54), and a control surface mixer (56). The components within the dashed line (58) represent the components of the additional force feedback aerial refueling system of the invention. These include the probe force conversion component, or the previously described computerized control coupler (14). The components also include a series of logical switches (62) which route the appropriate command signals to the inner-loop control component (54) and the aircraft control surface mixer (56).

The outer-loop guidance component (52) controls the steering of the aircraft in response to the input directional commands by computing aircraft load factor (Nz) (64), aircraft role rate (p) (66), aircraft side slip (B) (68), and throttle (72) commands.

The inner-loop control component (54) maintains stable flight of the aircraft by computing commanded moments or angular accelerations (L, M, N) about the respective aircraft x-axis, y-axis, and z-axis in response to the load factor (64), the role rate (66), and the side slip (68) commands, while rejecting disturbances such as wind gusts and maintaining design performance characteristics.

The controls surface mixer (56) sends control surface deflection commands to the aircraft's control surface actuators in response to commanded moments or angular accelerations from the inner-loop control component (54).

The probe force conversions (82) resolve the probe-receptacle coupling forces into aircraft body axis forces and moments and command the aircraft load factor (64), role rate (66), side slip (68), and throttle (72) to cancel the coupling forces.

The logical switches (62) pass the signals from the probe force conversions (82) to the inner-loop control component (54) when the refueling probe is engaged with the refueling receptacle (12). Otherwise, the logical switches (62) pass the signals of the outer-loop guidance component (52) to the inner-loop control component (54).

FIG. 1 represents one hypothetical example of the operation of the force feedback aerial refueling system of the invention. With the refueling receptacle (12) mounted in the aircraft (10) shown in FIG. 1, the receptacle (12) is positioned 6-feet in front of the aircraft's center of gravity (92) and 2 feet above the aircraft's center of gravity (92). In addition, the receptacle x-axis (42) is fixed at an angle of inclination of 10° degrees relative to a center line or body x-axis (94) of the aircraft (10).

For the example of FIG. 1, it is assumed that the refueling probe (not shown) is exerting a positive tensile force on the refueling receptacle (12) of 2000 lbs. To transform the tensile force exerted on the refueling receptacle (12) into the aircraft's body axis system along the aircraft center line (94), the computerized control coupler (14) computes a trigonometric transformation to rotate the refueling receptacle's x-axis (42), downwardly 10° degrees about the receptacle y-axis (44). From basic trigonometry, it follows that:

$Fx$ body=$Fx$ receptacle*cos(-10)

$Fx$ body=2000 $lbs.$*0.9848

$Fx$ body=1970 $lbs.$ $Fz$ body=$Fx$ receptacle*sin(-10)

$Fz$ body=2000 $lbs.$*-0.1737

$Fz$ body=-347 $lbs.$

Because the refueling receptacle is mounted in the aircraft (10) in a position that is off-set from the aircraft's center of gravity (92), the transformed Fx (96) and Fz (98) forces calculated above also exert a pitching moment or torque (denoted M) on the aircraft that tends to rotate the aircraft nose downward. This moment is calculated as follows:

$M=Fx$ body*$z$ off-set-$Fz$ body*$x$ off-set $M$=1970 $lbs.$*-2 $ft.$--347 $lbs.$*6 $ft.$ $M$=-1858 $lbs.$-$ft.$ Once the coupling forces are transformed to external forces and moments applied to the aircraft center of gravity (92), the control coupler (14) can trim the forces out. The external moments exerted on the aircraft center of gravity (92) are cancelled by commanding an equal magnitude but opposite direction moment. From the example above, the control coupler commands a positive (nose-up) pitching moment of 1858 lbs.-ft. to cancel the coupling moment exerted on the aircraft center of gravity (92). External forces are resolved into commanded accelerations of the aircraft (10) using the aircraft's mass. Again, referencing the example, canceling the coupling force along the aircraft's x-axis (96), which is coaxial with the aircraft center line (94), requires a positive acceleration of the aircraft (10) in the direction along the aircraft x-axis (96), resulting in a speed increase of the aircraft. Accelerations along the aircraft's x-axis (96) are most effectively obtained with changes in the engine throttle settings of the aircraft. Canceling the coupling force along the aircraft's z-axis (98) requires a negative z-axis acceleration of the aircraft, resulting in a climb of the aircraft. Accelerations along the aircraft's z-axis (98) are typically obtained with changes in the aircraft's load factor. The magnitudes of these accelerations are inversely proportional to the aircraft's mass.

As explained above, the transformation of the refueling probe coupling force vector components Fx, Fy, Fz acting on the refueling receptacle (12) into the aircraft's body axis system at the aircraft center of gravity (92) results in external forces and moment vectors applied at the aircraft's center of gravity (92). Canceling the external forces and moment vectors is relatively simple, as the moment components directly relate to the desired roll (wings up/down), pitch (nose up/down), and yaw (nose left/right) angular accelerations of the aircraft. It is typical of aircraft trimming capabilities that currently exist in modern aircraft control systems. Thus, the external moment signals (L, M, N) (67) for roll, pitch, and yaw are injected just upstream of the control surface mixer (56) as shown in FIG. 5. Canceling the external force vectors requires the use of both aerodynamic control effectors and aircraft throttle. The throttle setting is adjusted according to the force component along the aircraft x-axis (94) and is sent to the propulsion control system. The remaining y and z components of the external force vectors are combined into normal acceleration (Nz) and roll rate (p) commands. Alternatively, if the force component along the aircraft y-axis, which is perpendicular to the aircraft x-axis (96) and z-axis (98), is sufficiently small, then it can be resolved into a side slip (B) command, allowing the aircraft to "crab" into position. The normal acceleration (64), roll rate (66), and side slip (68) commands are sent to the inner-loop control component (54). Finally, a logical discreet that is set when the receptacle (12) and refueling probe make contact triggers the logical gates to pass the probe force conversion outputs of the control coupler (14) to the other air vehicle control system components. During the probe/receptacle contact, the aircraft's outer-loop guidance components (52) are essentially disabled. Hence, the aircraft effectively becomes a "towed object" behind the supplier aircraft.

Although the subject matter of the invention has been described above by reference to a specific embodiment, it should be understood that modifications and variations could be made to the subject matter of the invention without departing from the intended scope of the following claims.

What is claimed is:

1. An apparatus for refueling an aircraft in-flight, the apparatus comprising:

a refueling receptacle on the aircraft, the receptacle being adapted for receiving a separate fuel probe when refueling the aircraft in-flight;

at least one sensor on the receptacle, the sensor being adapted for sensing forces acting on the receptacle by a fuel probe received by the receptacle when refueling the aircraft in-flight; and, a control coupler on the aircraft, the control coupler communicating with the sensor and being adapted for controlling movement of the aircraft in-flight in response to forces acting on the receptacle that are sensed by the sensor.

2. The apparatus of claim 1, further comprising:

the aircraft being an unmanned aircraft.

3. The apparatus of claim 1, further comprising:

the sensor being one of a plurality of sensors on the receptacle, the plurality of sensors being adapted for sensing forces acting on the receptacle by a fuel probe received by the receptacle.

4. The apparatus of claim 3, further comprising:

each sensor of the plurality of sensors being adapted for sensing a magnitude of an external force acting on the receptacle and a direction of the external force acting on the receptacle.

5. The apparatus of claim 3, further comprising:

the plurality of sensors includes at least three sensors that are positioned on the receptacle to sense external forces acting on the receptacle along three mutually perpendicular axes.

6. The apparatus of claim 5, further compromising:

each of the three sensors being adapted for sensing external forces acting on the receptacle in two directions along each of the three mutually perpendicular axes.

7. The apparatus of claim 1, further comprising:

the aircraft having a center of gravity; and, the control coupler being adapted for transforming forces acting on the receptacle into equivalent external forces and moments acting on the aircraft center of gravity.

8. The apparatus of claim 1, further comprising:

the sensor being adapted for sensing a magnitude and direction of external forces acting on the receptacle; and, the control coupler being adapted for controlling movement of the aircraft in a direction that eliminates the external force acting on the receptacle.

9. The apparatus of claim 1, further comprising:

the aircraft having a control architecture that includes an outer-loop guidance component, an inner-loop guidance component, and a control surface mixer; and, the control coupler communicating with the aircraft control architecture.

10. The apparatus of claim 9, further comprising:

the control coupler communicating with the control surface mixer.

11. The apparatus of claim 9, further comprising:

the control coupler being adapted for overriding the aircraft outer-loop guidance component.

12. The apparatus of claim 1, further comprising:

the receptacle having a center axis that defines opposite positive and negative receptacle X-axis directions along the center axis, and defines opposite positive and negative receptacle Y-axis directions that are perpendicular to the receptacle X-axis directions, and defines opposite positive and negative receptacle Z-axis directions that are perpendicular to both the receptacle X-axis directions and the receptacle Y-axis directions;

and the sensor being one of a plurality of sensors that include an X-axis sensor that senses forces acting on the receptacle along the receptacle X-axis, a Y-axis sensor that senses forces acting on the receptacle along the receptacle Y-axis, and a Z-axis sensor that senses forces acting on the receptacle along the receptacle Z-axis.

13. The apparatus of claim 12, further comprising:

the control coupler communicating with the X-axis sensor, the Y-axis sensor and the Z-axis sensor to receive signals from the sensors that are representative of forces acting on the receptacle.

14. The apparatus of claim 13, further comprising:

the X-axis sensor, the Y-axis sensor, and the Z-axis sensor being adapted for producing signals that are representative of both a magnitude and a direction of forces acting on the receptacle.

15. A method of refueling an aircraft in-flight, the method comprising:

providing a refueling receptacle on the aircraft;

receiving a separate refueling probe by the receptacle when refueling the aircraft in-flight;

providing at least one sensor on the receptacle;

with the sensor, sensing forces acting on the receptacle from the refueling probe received by the receptacle;

providing a control coupler on the aircraft that receives signals from the sensor that are representative of the forces acting on the receptacle; and, with the control coupler, controlling movements of the aircraft in-flight that cause the forces acting on the receptacle to be reduced.

16. The method of claim 15, further comprising:

with the control coupler, controlling movements of the aircraft by changing acceleration of the aircraft.

17. The method of claim 15, further comprising:

with the sensor, sensing both a magnitude and a direction of forces acting on the receptacle.

18. The method of claim 15, further comprising:

the aircraft being an unmanned aircraft.

19. The method of claim 15, further comprising:

providing a plurality of sensors on the receptacle that sense forces acting on the receptacle along three mutually perpendicular axes.

20. A method of refueling an unmanned aircraft in-flight, the method comprising:

providing a refueling receptacle on the aircraft, the refueling receptacle having a center axis that defines opposite positive and negative receptacle X-axis directions along the receptacle center axis, and defines opposite positive and negative receptacle Y-axis directions that are perpendicular to the receptacle X-axis directions, and defines opposite positive and negative receptacle Z-axis directions that are perpendicular to both the receptacle X-axis directions and the receptacle Y-axis directions;

providing an X-axis sensor on the receptacle that senses forces acting on the receptacle along the receptacle X-axis;

providing a Y-axis sensor on the receptacle that senses forces acting on the receptacle along the receptacle Y-axis;

providing a Z-axis sensor on the receptacle that senses forces acting on the receptacle along the receptacle Z-axis;

providing a control coupler on the aircraft that communicates with the X-axis sensor, the Y-axis sensor, and the Z-axis sensor to receive signals from the sensors that are representative of forces acting on the receptacle, the control coupler being operative to control movement of the aircraft to reduce the signals that are representative of forces acting on the receptacle.

* * * * *